United States Patent
Jensen et al.

(10) Patent No.: US 11,457,004 B2
(45) Date of Patent: Sep. 27, 2022

(54) HYBRID CLOUD APPLICATION PROGRAMMING INTERFACE MANAGEMENT PLATFORM

(71) Applicant: Aetna Inc., Hartford, CT (US)

(72) Inventors: Claus T. Jensen, Pawling, NY (US); Joseph Arnold, Hartford, CT (US); Erik Solinger, Hartford, CT (US)

(73) Assignee: Aetna Inc., Hartford, CT (US)

( * ) Notice: Subject to any disclaimer, the term of this patent is extended or adjusted under 35 U.S.C. 154(b) by 372 days.

(21) Appl. No.: 16/701,678

(22) Filed: Dec. 3, 2019

(65) Prior Publication Data
US 2021/0168127 A1    Jun. 3, 2021

(51) Int. Cl.
| | |
|---|---|
| *H04L 9/40* | (2022.01) |
| *H04L 9/32* | (2006.01) |
| *G06F 8/60* | (2018.01) |
| *H04L 61/4511* | (2022.01) |
| *H04L 67/51* | (2022.01) |
| *G06Q 30/06* | (2012.01) |
| *H04L 101/35* | (2022.01) |
| *H04L 67/00* | (2022.01) |

(52) U.S. Cl.
CPC ............... *H04L 63/08* (2013.01); *G06F 8/60* (2013.01); *G06Q 30/0603* (2013.01); *H04L 9/3213* (2013.01); *H04L 9/3228* (2013.01); *H04L 9/3234* (2013.01); *H04L 9/3263* (2013.01); *H04L 61/1511* (2013.01); *H04L 67/16* (2013.01); *H04L 61/305* (2013.01); *H04L 67/34* (2013.01)

(58) Field of Classification Search
CPC ................................... H04L 63/08; G06F 8/60
See application file for complete search history.

(56) References Cited

PUBLICATIONS

Jensen, Claus T. "The Hybrid Cloud Journey," *The Hybrid Cloud Journey For Dummies, CVS Health Special Edition*, published by John Wiley & Sons, Inc. (May 7, 2019).

*Primary Examiner* — Esther B. Henderson
(74) *Attorney, Agent, or Firm* — Leydig, Voit & Mayer, Ltd.

(57) ABSTRACT

A system and method are disclosed for managing the deployment of application programming interfaces (APIs) within a hybrid cloud network architecture. APIs can be created for applications or services deployed to a hybrid cloud including public clouds and/or private clouds. The APIs are deployed to API gateways associated with each data center in the network. The network is conceptually divided into spaces, where each space corresponds to a set of API gateways deployed within designated geographical regions. The API gateways are mapped to the network locations for the API gateways by interacting with Domain Name System (DNS) name servers. API calls use the domain names as included in the DNS records to resolve the API call as being directed to a specific API gateway corresponding to the service for the API call.

21 Claims, 11 Drawing Sheets

HYBRID CLOUD APPLICATION PROGRAMMING INTERFACE MANAGEMENT PLATFORM

BACKGROUND

Cloud-based applications or services are deployed for a variety of tasks. Service Providers manage servers, or rent network resources from cloud service providers, to run the services. Organizations may run private clouds that are restricted to be used internally among the organization's clients, or the organizations may run public clouds that expose those services to external clients through a wide area network (WAN) such as the Internet.

As the breadth of services available through public clouds or private clouds increases, organizations can leverage these services to build applications with a large amount of functionality. The applications can call services within the private cloud or public clouds to perform various tasks. The availability of these services makes deploying new applications easier because developers are not required to write code for performing tasks already handled by existing services.

However, utilizing services throughout the hybrid cloud architecture can be challenging. For example, each service implemented by a different service provider can utilize a different application programming interface (API). Furthermore, after the initial deployment, an API for a particular service utilized by an application can change as the service provider updates the code for their service. This can break the functionality of the application. In addition, each service may handle authentication and authorization of service calls differently. The application may need to maintain accounts with each service provider and include special functionality for authenticating a service call with the third-party API for the service. These aspects, among others, can make developing applications in a hybrid cloud architecture more difficult.

SUMMARY

The following describes a technique for managing the deployment of APIs within a hybrid cloud network architecture. APIs can be created for applications or services deployed to a hybrid cloud including public clouds and/or private clouds. The APIs are deployed to API gateways associated with each data center in the hybrid cloud network. Each API should be deployed as close to the underlying service and/or data accessed through the API as possible. The API gateways are mapped to the network locations for the API gateways by interacting with Domain Name System (DNS) name servers that map domain names for the API gateways to an address for the API gateways. API calls can then use the domain names as included in the DNS records maintained by the DNS name servers.

In an embodiment, a system is disclosed for managing services within a hybrid cloud architecture. The system includes at least one processor configured to deploy APIs to a plurality of API gateways accessible via a network. The network is divided into one or more spaces, each space in the one or more spaces corresponding to a set of API gateways deployed to one or more geographical regions. Each API gateway is connected to a number of services executing on a cluster of runtime devices connected to the API gateway.

In an embodiment, the at least one processor is configured to deploy APIs to at least two API gateways associated with at least two different spaces.

In an embodiment, an organization that develops the APIs is different from an external organization that develops at least one service in the number of services. The external organization maintains a data center that includes at least one API gateway configured to receive an API from the at least one processor via the network.

In an embodiment, the at least one processor is configured to interact with one or more DNS name servers to map a fully qualified domain name to an Internet Protocol (IP) address for a corresponding API gateway. In some embodiments, the at least one processor is configured to interact with at least two DNS name servers for at least two different domains corresponding to at least two branded organizations. In an embodiment, the fully qualified domain name includes a DNS prefix that indicates a particular space associated with the corresponding API gateway. In one embodiment, interacting with one or more DNS name servers comprises at least one of adding, deleting, or modifying a CNAME record. In some embodiments, the at least one processor is further configured to update a security certificate to add the fully qualified domain name to a subject alternative name (SAN) field of the security certificate.

In an embodiment, the system further includes an API portal configured to authenticate users and provide authenticated users visibility to one or more catalogs of products. Each catalog is associated with a domain and includes one or more products associated with the domain.

In an embodiment, each API is permitted to call services within a data center in which the API is deployed, and each API is prohibited from calling services in other data centers directly.

In an embodiment, each API gateway includes an authentication engine configured to generate a token for an authenticated consumer application. The token is generated based on a shared secret provided to the plurality of API gateways, and the authenticated consumer application is configured to utilize the token when connecting to other API gateways in the plurality of API gateways.

In an embodiment, a method is disclosed for managing services within a hybrid cloud architecture. The method includes the steps of receiving one or more APIs that correspond to one or more services available over a network, and deploying the one or more APIs to a plurality of API gateways accessible via the network, Each API gateway is associated with a space that corresponds with one or more geographical regions.

In an embodiment, deploying the one or more APIs to the plurality of API gateways is performed by, for each API in the one or more APIs, identifying a particular space corresponding to the API and transmitting the API to one or more API gateways associated with the particular space.

In an embodiment, the method further includes the steps of interacting with one or more DNS name servers to map a fully qualified domain name to an IP address for a corresponding API gateway and updating a security certificate to add the fully qualified domain name to a SAN field of the security certificate.

In an embodiment, a computer readable medium is disclosed for storing instructions that, when executed by a processor, cause the processor to perform the method to manage services within a hybrid cloud architecture.

DETAILED DESCRIPTION

APIs are deployed within a hybrid cloud architecture in order to provide a consistent experience for calling a variety of services or applications within a hybrid cloud. More specifically, a mix of applications or services can be developed internally within an organization or externally by affiliates or third parties to the organization. The organization can define standards for APIs developed for these services that allow for consumer applications to subscribe to or interact with products made available by the organization through the APIs. For example, the organization can enforce naming conventions for the APIs, standard methods implemented by each API, formats for delivering responses by the APIs, and so forth. In addition, the organization can also streamline authentication and authorization procedures that enable the consumer application to efficiently connect with the APIs deployed across many different public or private clouds, both those maintained by the organization and those external to the organization.

In some embodiments, APIs are deployed to API gateways instantiated within each data center within the network. Even if a data center is managed by a separate entity or organization, that entity or organization can provision resources within that data center to act as the API gateway such that an API management platform can deploy APIs to the API gateway that correspond to services developed and/or maintained by the entity or organization in that data center. Consequently, an organization can partner with third-parties or affiliates to include their services within a hybrid cloud managed by the organization, even if those services are deployed in a data center external to the organization's data centers.

Figure 1:
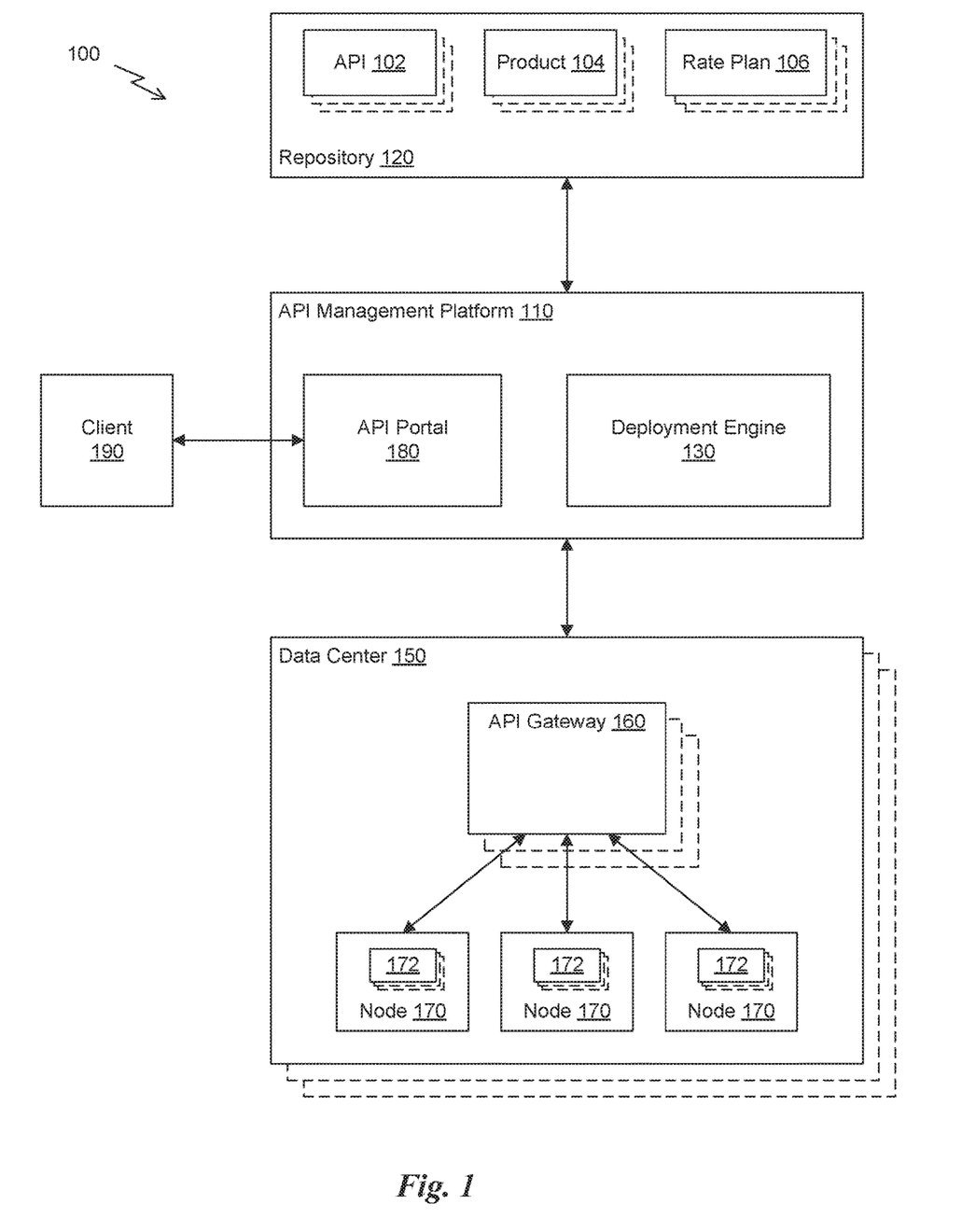
FIG. 1 illustrates a system for managing application programming interfaces for a plurality of services, in accordance with some embodiments.

FIG. 1 illustrates a system 100 for managing application programming interfaces for a plurality of services, in accordance with some embodiments. As depicted in FIG. 1, the system 100 includes an API management platform 110, one or more data centers 150, and a repository 120. The repository 120 provides storage for a global catalog of APIs 102 managed by an organization and related to applications or back-end services deployed in a network. Each data center 150 can include a cluster of runtime devices (e.g., nodes 170) connected to an API gateway 160. The cluster of runtime devices can be configured to execute processes that implement a network-based service 172.

In an embodiment, the repository 120 also provides storage for products 104 and rate plans 106. As used herein, a product 104 is a data structure or file that identifies one or more APIs 102 collected into an offering for a consumer application developed by a developer. The product 104 can include a list of APIs 102 for the back-end services or applications as well as other information, such as information that identifies a space or region where the product is deployed. A space refers to a conceptual division of the network into geographical regions that correspond to a set of API gateways deployed to the geographical regions. As used herein, a rate plan 106 is a data structure or file that specifies various parameters that allow a consumer to subscribe to a product 104. The parameters for a rate plan 106 can include a number of allowed connections between a consumer and a service, a number of service calls permitted per unit of time, which can alternatively be referred to as a rate limit for the product, a price associated with subscribing to the rate plan, as well as any other information related to subscribing to a product 104.

In an embodiment, an API 102 is a set of instructions configured as a front-end interface for a service or application. The API 102 provides a means for a separate application to call the service or application. In an embodiment, the API 102 is a web server that implements a HyperText Transfer Protocol (HTTP). The API 102 is configured to receive HTTP or HTTPS requests on a port or ports of a network interface of the network node executing the API 102. In other embodiments, the API 102 can be implemented using another protocol such as User Datagram Protocol (UDP) or Transmission Control Protocol (TCP).

In an embodiment, the API management platform 110 includes a deployment engine 130 and an API portal 180. The API management platform 110 can be implemented by at least one processor configured to execute instructions that cause the at least one processor to provide the functionality described below. In an embodiment, the deployment engine 130 is configured to deploy instances of the APIs 102, via a network, to API gateways 160 included in one or more data centers 150, Each API gateway 160 associated with a data center 150 is capable of communicating with a plurality of network nodes 170 deployed in the data center 150. In an embodiment, the network nodes 170 are computer systems such as a server device included in a rack of the data center 150. In other embodiments, the network nodes 170 are virtual machines (VMs) running on one or more server devices and managed by a hypervisor. In yet other embodiments, the network nodes 170 are standalone computer systems connected to a local area network (LAN) through a wired connection, such as an Ethernet as defined in the Institute of Electrical and Electronics Engineers (IEEE) 802.3 standards, or a wireless connection, such as a wireless local area network (WLAN) Wi-Fi connection as defined in the IEEE 802.11 standards.

In an embodiment, the API gateway 160 is also a network node in the data center 150 and can comprise a server or a VM running on a server device. The API gateway 160 provides a front-end for consumer applications to call the back-end services 172 running on the network nodes 170. It will be appreciated that each data center 150 can include at least one network node configured to act as the API gateway 160. The deployment engine 130 maintains information related to the location of each API gateway 160 and is configured to interact with the API gateways 160 to deploy the APIs 102 from the repository 120.

In some embodiments, the deployment engine 130 is configured to dynamically instantiate new API gateways 160, as needed, to handle dynamic loads related to API calls. For example, when a number of API calls received at an API gateway is above a threshold value for a given unit of time, then the deployment engine 130 can be configured to create a new instance of an API gateway within a data center 150. Similarly, if the number of API calls received within a unit time drops below a threshold value, then the deployment engine 130 can determine whether the number of API gateways associated with the data center 150 can be reduced and remove one or more API gateways from the data center 150. In other embodiments, the deployment engine 130 is configured to interact with additional applications or services that monitor network loads and call the deployment engine 130 in order to create or remove API gateways 160 from the network.

In an embodiment, the deployment engine 130 is configured to transmit a copy of a particular AN 102 to a corresponding API gateway 160. The API gateway 160 is configured to execute the API 102, which then listens to a port or ports of a network interface of the API gateway 160 for messages that implement API calls for one of the services 172 deployed to a connected network node 170 in the data center 150. The deployment engine 130 can also update network resources to indicate to various applications that the API 102 is actively deployed to the API gateway 160, as will be discussed in more detail below. In some embodiments, the deployment engine 130 is configured to deploy APIs 102 to at least two API gateways 160 associated with at least two different spaces or geographical regions.

In an embodiment, an organization that develops the APIs 102 is different from an external organization (e.g., third-party developer, affiliate organization, etc.) that develops at least one service 172. In other words, a develop for the organization that runs the API management platform 110 can develop APIs 102 that are paired with external services developed and/or maintained by a separate entity or developer. The external organization can maintain a data center, for deployment of the services, that includes at least one API gateway 160 configured to receive an API 102 from the deployment engine 130 via the network. In an embodiment, the deployment engine 130 maintains a list of all API gateways 160 within the network, which can be updated as API gateways are brought online by the organization or external organizations that partner with the organization.

In an embodiment, each API 102 is permitted to call services 172 within a data center 150 in which the API 102 is deployed. The APIs 102, through standard conventions enforced by, the organization, is prohibited from calling services 172 in other data centers 150 directly. Instead, an API 102 or service 172 in one data center 150 is only allowed to call a different API 102 for a service 172 in another data center 150.

In an embodiment, the API portal 180 is an application, such as a web server, that is configured to interact with client devices 190, The API portal 190 enables developers to be authenticated using credentials and provides information on products 104 available to the developer to utilize in a consumer application. In other words, the API portal 180 is an application that is configured to authenticate users and provide authenticated users visibility to one or more catalogs of products 104. Each catalog is associated with a domain and includes one or more products associated with the domain. An organization can maintain a global catalog that includes catalogs for a plurality of different domains. The API portal 180 can also provide the developer with documentation on the APIs 102 associated with the products 104.

Figure 2A:
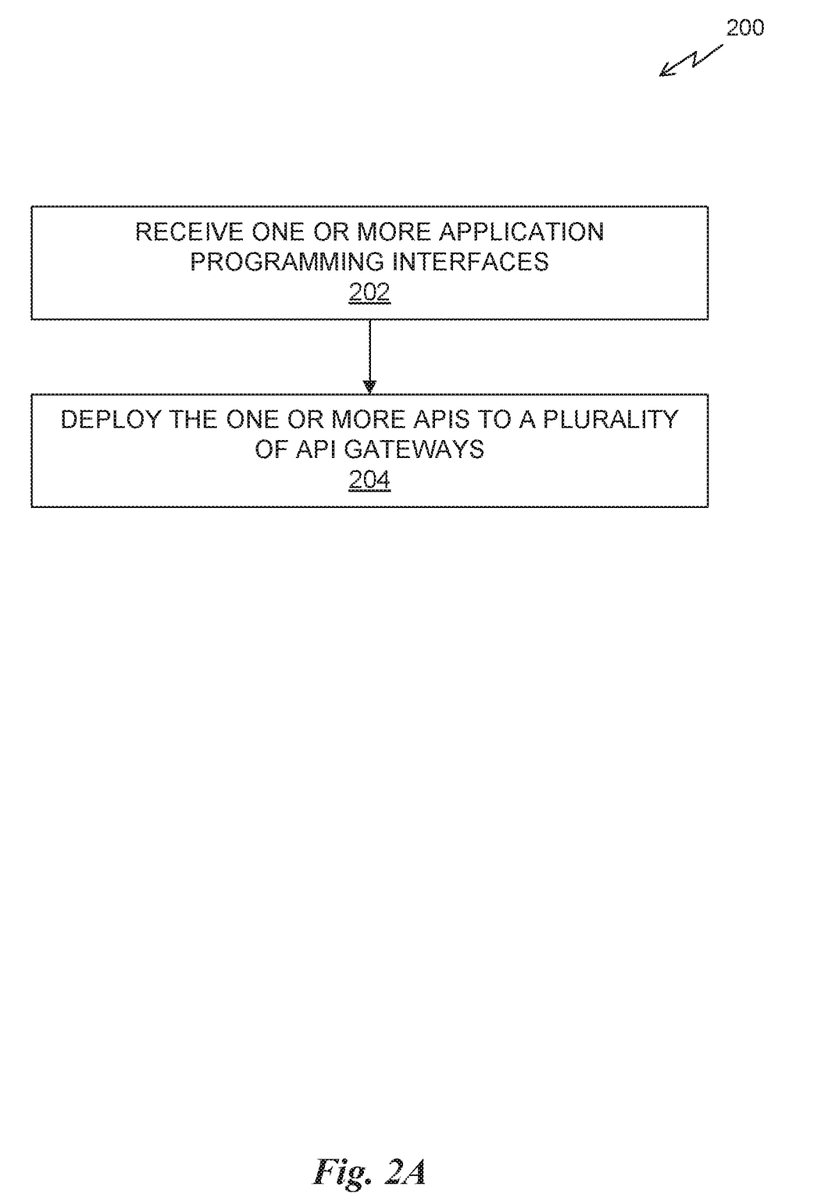
FIG. 2A is a flow diagram of a method for deploying APIs, in accordance with some embodiments.

FIG. 2A is a flow diagram of a method 200 for deploying APIs 102, in accordance with some embodiments. The method 200 can be performed by a program, custom circuitry, or by a combination of custom circuitry and a program. For example, the method 200 can be performed by one or more processors configured to execute instructions that cause the processor(s) to carry out the steps of the method 200. Furthermore, persons of ordinary skill in the art will understand that any system that performs method 200 is within the scope and spirit of the embodiments described herein.

At step 202, a deployment engine 130 receives one or more APIs 102 that correspond to one or more services available over a network. In an embodiment, the deployment engine 130 maintains a catalog of the APIs 102 and products 104 stored in the repository 120. The deployment engine 130 can load the APIs 102 from the repository 120 by transmitting a request to the repository 120. The deployment engine 130 receives a response from the repository 120 that includes a copy of the API 102.

At step 204, the deployment engine 130 deploys the one or more APIs 102 to a plurality of API gateways 102 accessible via the network. In an embodiment, the deployment engine 130 transmits the copy of the API 102 to the API gateway 160. The deployment engine 130 causes the API gateway 160 to execute the API 102. In some embodiments, the deployment engine 130 also interacts with one or more name servers to associate at least one fully qualified domain name (FQDNs) with a location of each API gateway 160. The records in the name servers enable consumer applications to make API calls to the APIs 102 using the FQDNs.

In some embodiments, the network is divided into a plurality of spaces. As used herein, a space refers to a division of the network within a particular geographical region. The geographical region can include one or more data centers 150. For example, a first space can refer to a collection of data centers 150 in the eastern United States and a second space can refer to a collection of data centers 150 in the western United States. Another space can refer to data centers 150 in Europe.

Figure 2B:
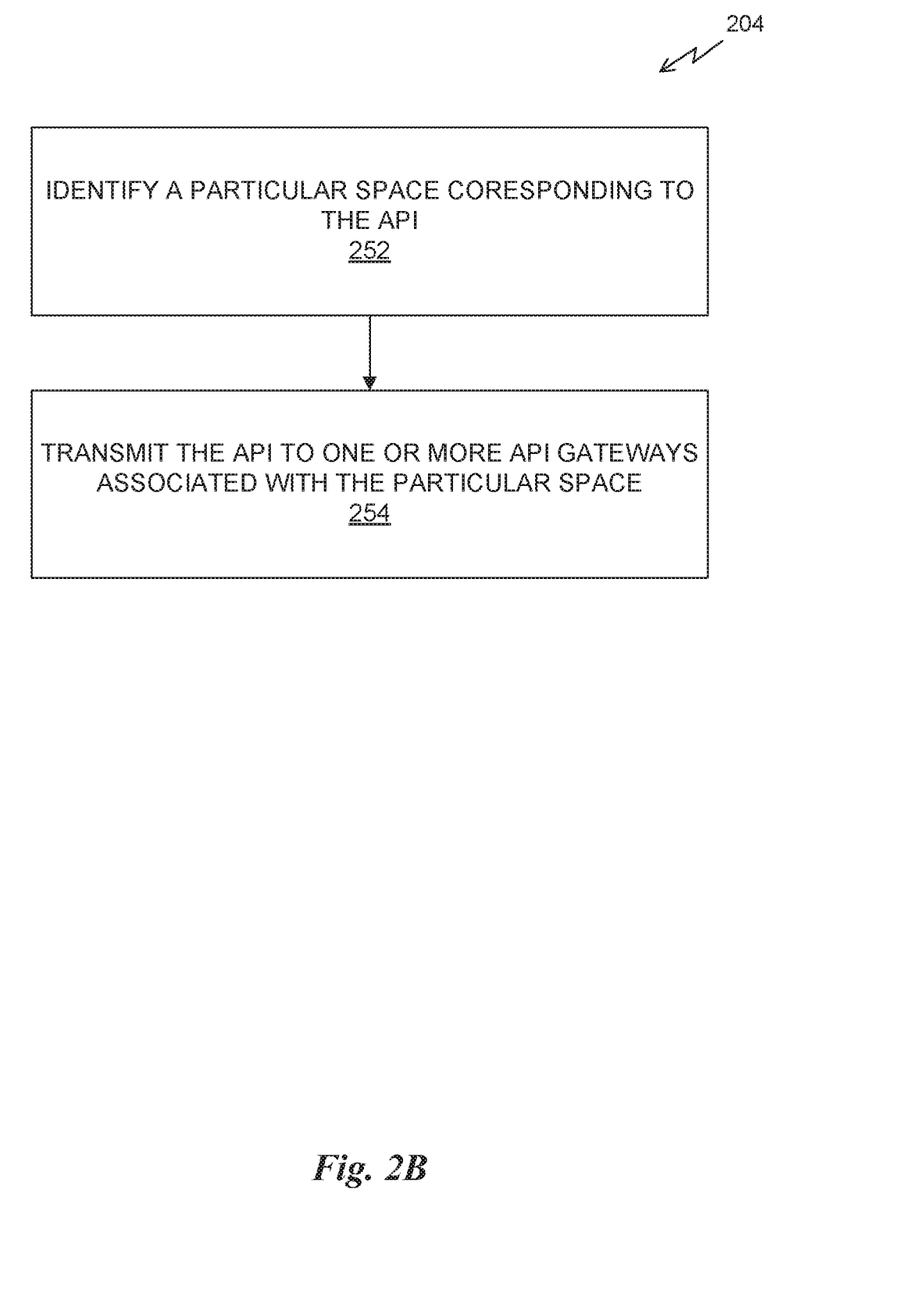
FIG. 2B is a flow diagram of a method for deploying an API to an API gateway, in accordance with some embodiments.

FIG. 2B is a flow diagram of a method 250 for deploying an API to an API gateway 160, in accordance with some embodiments. Similar to the method 200, the method 250 can be performed by a program, custom circuitry, or by a combination of custom circuitry and a program. The method 250 can be performed as part of step 204 of method 200.

At step 252, the deployment engine 130 identifies a particular space corresponding to a selected API 102. In an embodiment, each API 102 should be deployed to an API gateway 160 in the same data center 150 as the corresponding service 172 for the API 102. In other words, there is a desire to maintain performance of an API 102 by locating the API 102 as close to the underlying service 172 and/or data associated with the service 172 as possible. By ensuring that the API 102 is located in a particular API gateway 160 close to the service 172, the deployment engine 130 helps to ensure responses are provided to the consumer applications efficiently.

In an embodiment, a developer of the API 102 can specify a space where the API should be deployed. The deployment engine 130 can read a configuration file for the API 102 to identify the space and then identify a corresponding API gateway 160 within that space.

At step 254, the deployment engine 130 transmits the API 102 to one or more API gateways associated with the particular space. Again, the deployment engine 130 can transmit a copy of the API 102 to the API gateway 160. The deployment engine 130 can also transmit a message that causes the API gateway 160 to execute the API 102.

Figure 2C:
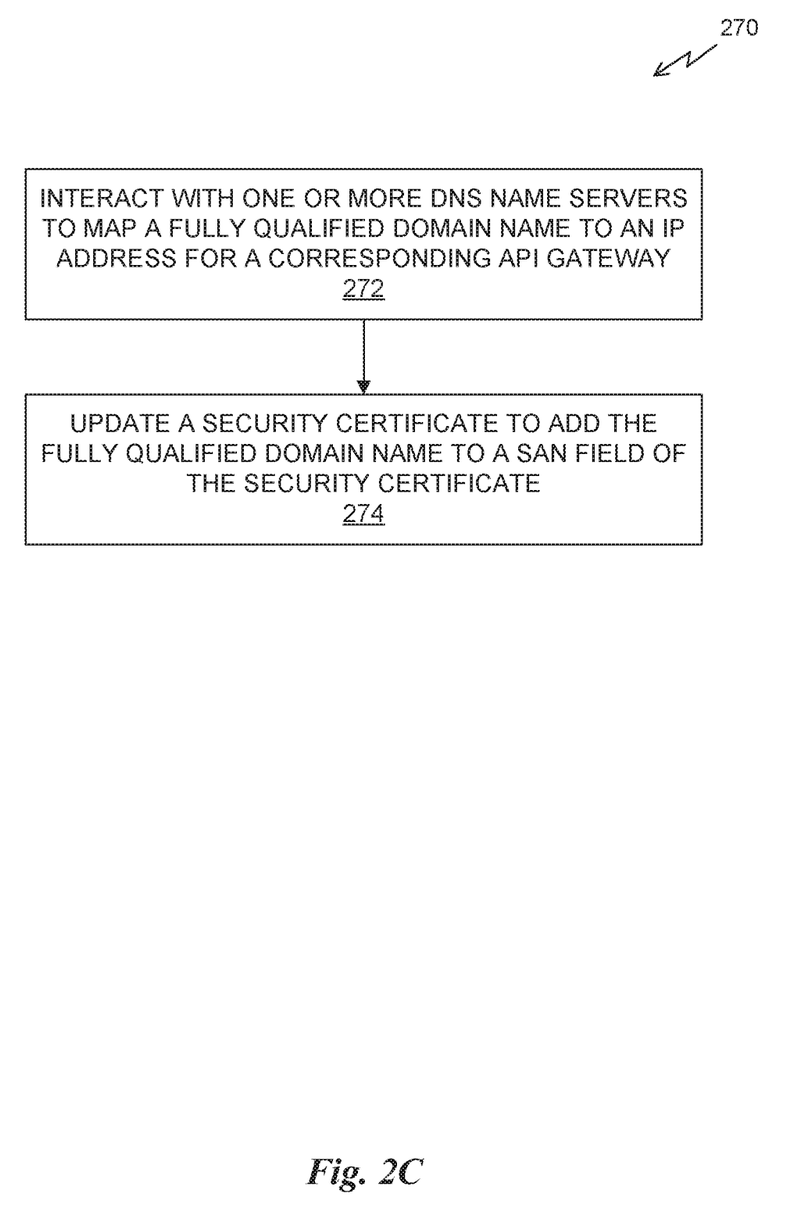
FIG. 2C is a flow diagram of a method for interacting with one or more name servers, in accordance with some embodiments.

FIG. 2C is a flow diagram of a method 270 for interacting with one or more name servers, in accordance with some embodiments. Similar to the method 200, the method 270 can be performed by a program, custom circuitry, or by a combination of custom circuitry and a program. The method 270 can be performed as part of step 204 of method 200.

At step 272, the deployment engine 130 interacts with one or more DNS name servers to map a FQDN to an IP address for a corresponding API gateway 160. In an embodiment, the deployment engine 130 can cause the DNS name server to add or modify a DNS record for the API gateway 160. The DNS record can be an A record that associates a FQDN for the API gateway 160 with an IP address for the API gateway 160. In an embodiment, a DNS prefix of the FQDN includes an indication of the space corresponding to the FQDN. For example, each space in one or more spaces can be assigned an index (e.g., 1, 2, etc.) and the index can be included in the DNS prefix of the FQDN. For example, a FQDN for the API gateway 160 can be in the form apigw{space index}.{domain}.com, such as apigw2.organization.com.

At step 274, the deployment engine 130 updates a security certificate to add the FQDN for the API gateway 160 to the subject alternative name (SAN) field of the security certificate. In an embodiment, a certificate authority can issue a certificate for the organization, which can be used in conjunction with secure communications with the API gateway 160. The security certificate is updated to include the FQDN for each API gateway 160 associated with the organization. In some embodiments, the security certificate can be used in conjunction with a session token issued to a consumer application in response to authenticating the consumer application.

Figure 3:
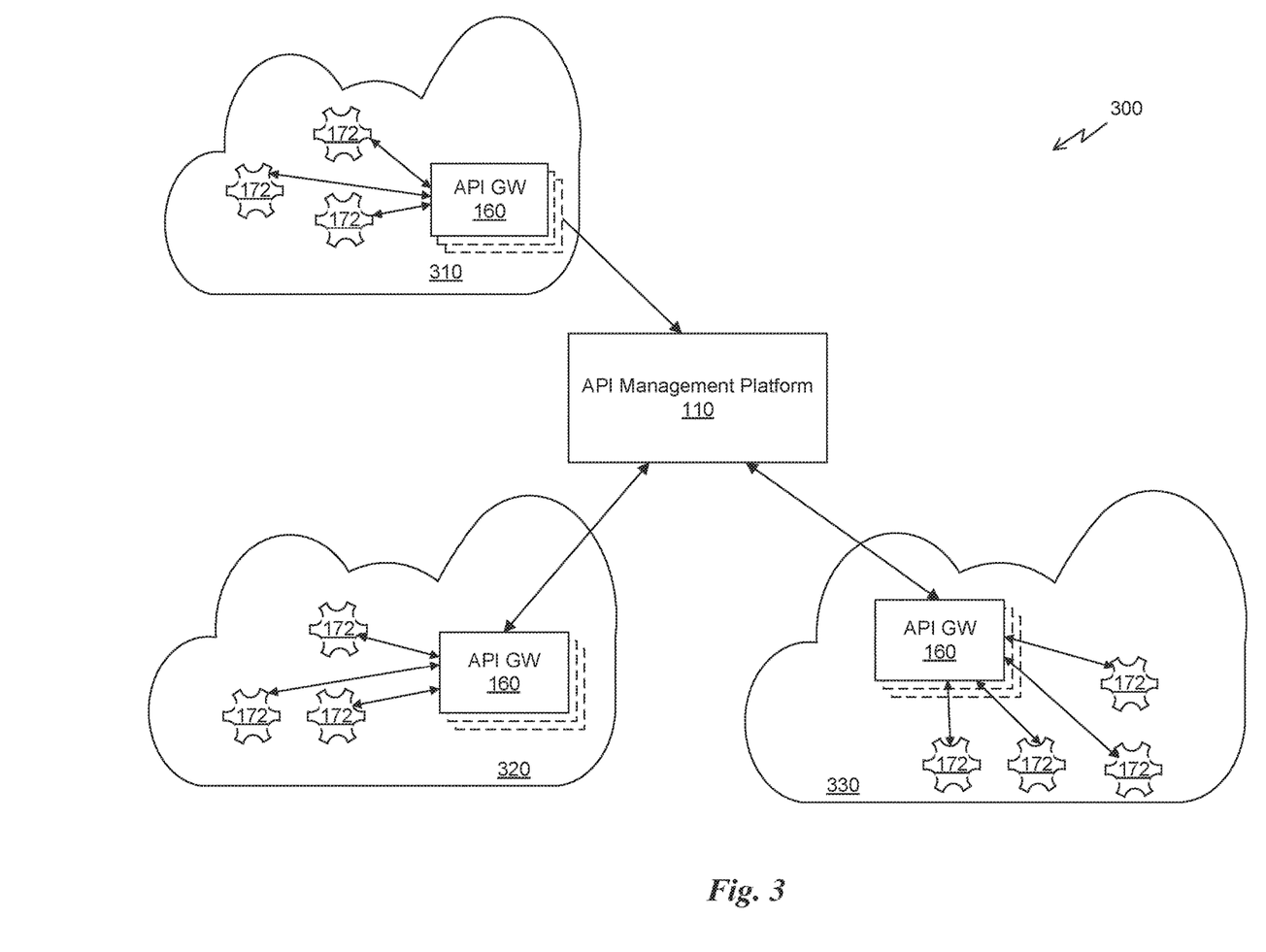
FIG. 3 illustrates a network that includes the API management platform, in accordance with some embodiments.

FIG. 3 illustrates a network 300 that includes the API management platform 110, in accordance with some embodiments. As depicted in FIG. 3, the API management platform 110 is connected to a public cloud data center 310, a private cloud data center 320, and an on-premise data center 330. As used herein, a public cloud refers to a set of cloud-based services accessible to the public, and a private cloud refers to a set of cloud-based services that is hosted on an intranet or secure behind a firewall to restrict access to devices attached to the intranet. The on-premise data center 330 is owned and managed by the organization on-site and can host either a private cloud or a public cloud managed by the organization.

As shown, each data center 310, 320, 330 includes one or more API gateways 160 connected to services 172 executing on the nodes of the data center 150. It will be appreciated that one or more of the public cloud data center 310 or the private cloud data center 320 are not hosted in a data center owned by the organization. For example, the private cloud data center 320 could be maintained and managed by a cloud service provider that leases resources to the organization to run a private cloud for their enterprise services. Similarly, the public cloud data center 310 can be maintained and managed by the same or a separate cloud service provider that leases resources to the organization to run a public cloud that exposes services to external devices.

Figure 4:
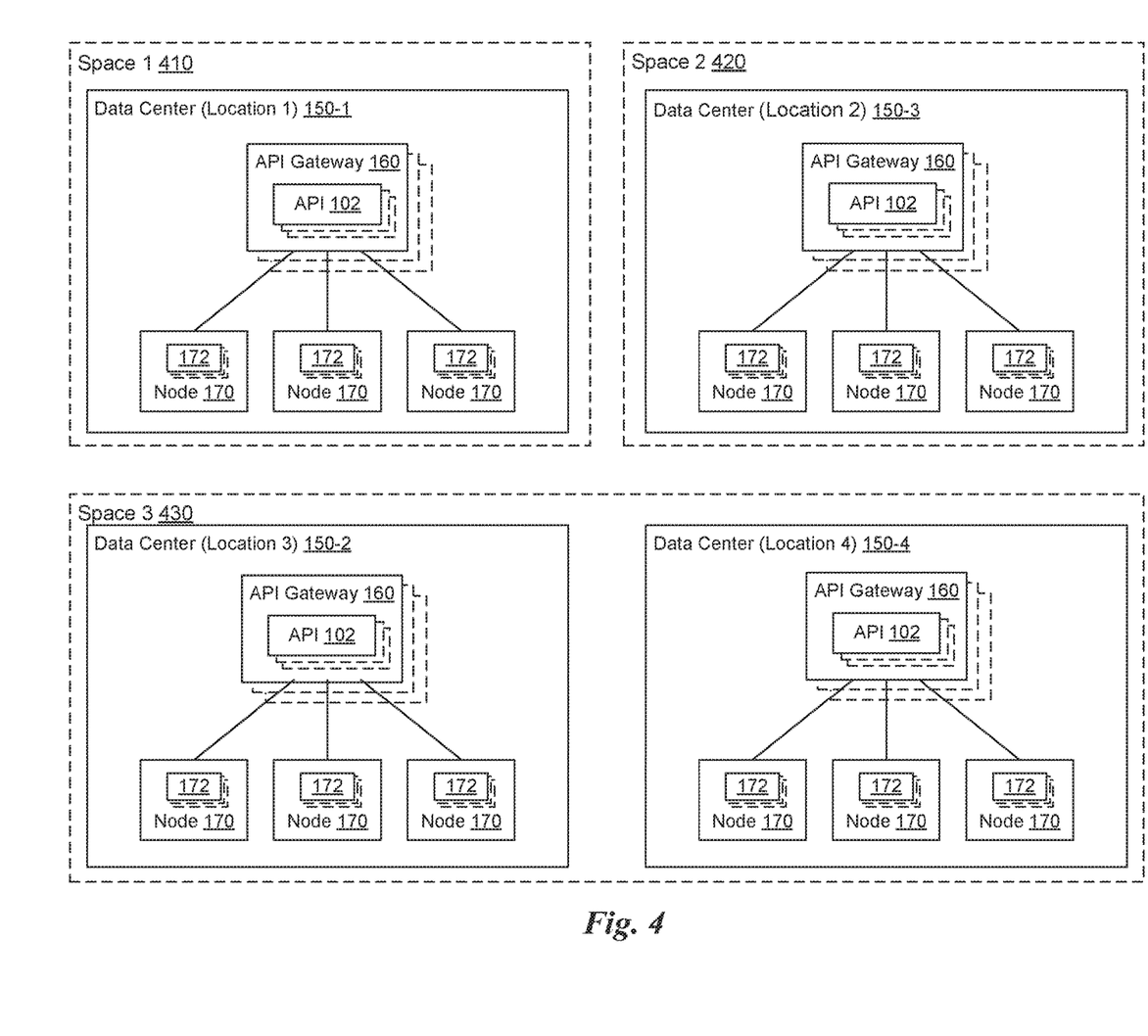
FIG. 4 illustrates the concept of a space, in accordance with some embodiments

FIG. 4 illustrates the concept of a space, in accordance with some embodiments. Again, a space refers to a division of network resources by geographical regions. Each space can include one or more data centers 150, where each data center 150 can be located in a different location within the geographical region, but data centers 150 in one space are not co-located with data centers 150 in another space.

As depicted in FIG. 4, the network 300 can be divided into three spaces. A first space 410 includes one data center 1504 located at location 1 in a first geographical region, a second space 420 includes one data center 150-2 located at location 2 in a second geographical region, and a third space 430 includes two data centers 150-3, 150-4 located at a location 3 and a location 4, respectively, in a third geographical region. In some embodiments, each data center 150 is assigned to a particular space corresponding to the geographical region in which that data center 150 is located. An API 102 can be deployed to a particular space, and the deployment engine 130 can identify the particular space associated with the API 102 in order to identify the API gateway 160 for purposes of deploying said API 102, In alternative embodiments, an API 102 can be deployed to a particular data center 150 within a particular space. For example, the API 1.02 can be assigned to either the third data center 150-3 or the fourth data center 150-4 in the third space. The deployment engine 130 can identify an API gateway 160 within that data center 150 for purposes of deploying said API 102

Figure 5:
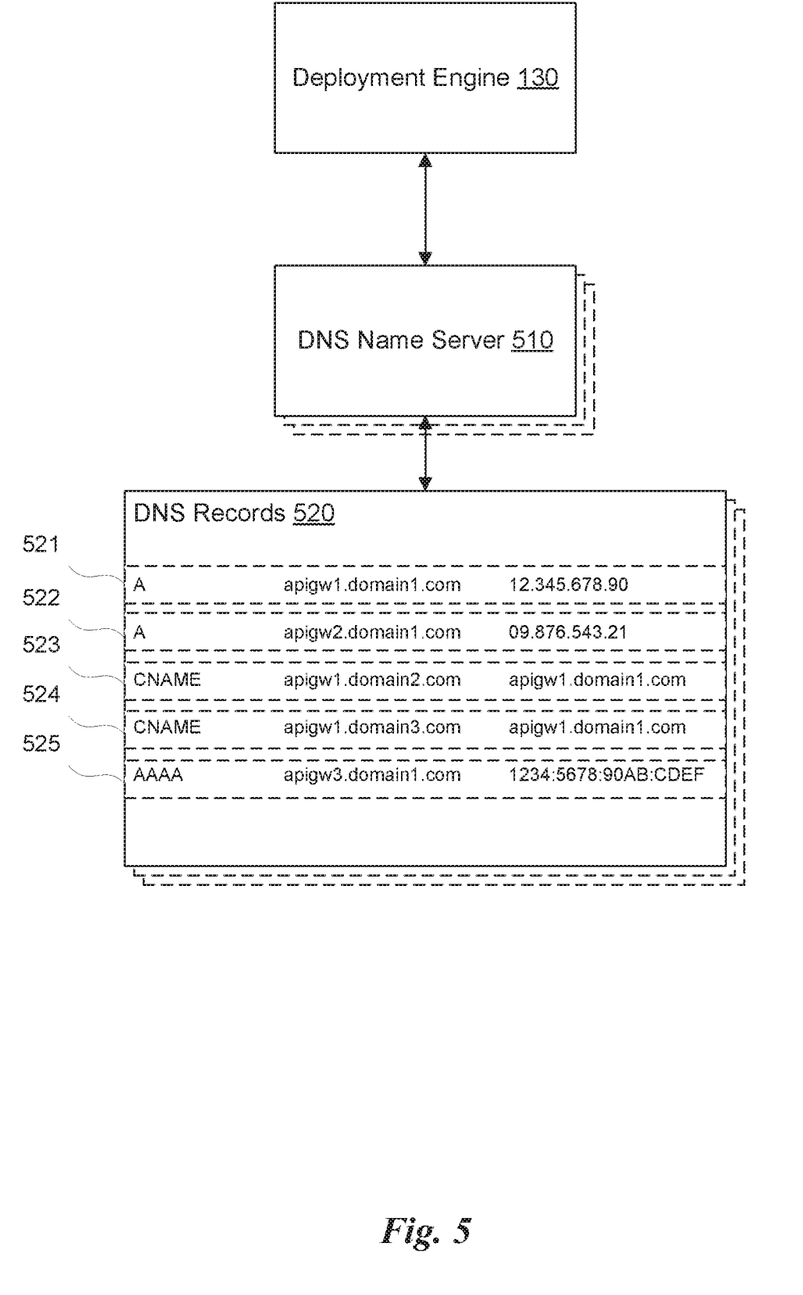
FIG. 5 illustrates a technique for interacting with one or more DNS name servers, in accordance with some embodiments.

FIG. 5 illustrates a technique for interacting with one or more DNS name servers 510, in accordance with some embodiments. Each organization may maintain one or more name servers for one or more domains maintained by the organization. It will be appreciated that as businesses acquire different business units, those companies may absorb different domains that the business continues to maintain as related to different brands owned by the organization, or businesses may create different brands for different products created by a particular business unit, where each brand is associated with a different domain. For example, a particular business may develop products called widget1 and widget2, and register the domains "widget1.com" and "widget2.com" for each of the respective products.

In an embodiment, as each API gateway 160 is instantiated, the deployment engine 130 causes a DNS name server 510 to create DNS records 520 for the API gateway 160. The DNS records 520 can include A records that map a FQDN to an IPv4 address, AAAA records that map a FQDN to an IPv6 address, and CNAME records that map an alias FQDN to a different FQDN. For example, the DNS records 520 shown in FIG. 5 include a first A record 521 that maps a FQDN for a first API gateway 160 to an IP address for the first API gateway 160, a second A record 522 that maps a FQDN for a second API gateway 160 to an IP address for the second API gateway 160, a CNAME record 523 that maps a FQDN for the first API gateway 160 in a second domain to a FQDN for the first API gateway 160 in the first domain, a CNAME record 524 that maps a FQDN for the first API gateway 160 in a third domain to a FQDN for the first API gateway 160 in the first domain, and a AAAA record 525 that maps a FQDN for a third API gateway 160 to an IP address for the third API gateway 160.

It will be appreciated that the CNAME records enable the same API 102 to be called using URLs for different domains (e.g., domain1.com, domain2.com, or domain3.com) without having to instantiate different versions of the API 102 on different API gateways 160 associated with each of the different domains. Instead, a call to resolve a URL for one domain will be mapped to the IP address for the API gateway 160 associated with the different domain. In some embodiments, the deployment engine 130 is configured to interact with at least two DNS name servers 510 for at least two different domains corresponding to at least two branded organizations. As used herein, a branded organization can refer to either a particular brand associated with an organization for which the organization maintains a separate domain, or a branded organization can refer to a particular business unit that maintains a separate domain for that business unit. Thus, at least two branded organizations can refer to either a single organization that maintains separate brands or separate organizations (e.g., subsidiaries) within an umbrella organization, where each subsidiary or business unit maintains a separate brand associated with a separate domain.

In an embodiment, a DNS prefix that is part of a FQDN for an API gateway 160 indicates the space or geographical region where the API gateway 160 is deployed. In an embodiment, an index assigned to each space or geographical region is appended to a name for the API gateway. For example, a DNS prefix of "apigw1" is used for an API gateway 160 having a name "apigw" that is located in a space or geographical region with an index of 1. Consequently, any API call that includes the domain of "apigw1.domain1.com" in the URL for the API 102 will be known to be directed to the API gateway 160 in a particular space assigned to index 1. It will be appreciated that, even under a different domain, such naming convention holds true as "apigw1.domain2.com" and "apigw1.domain3.com" both resolve to the same IP address for the API gateway 160 located in the space assigned to index 1. In some embodiments, the deployment engine 130 is configured to interact with the one or more DNS name servers 510 by causing a DNS name server 510 to at least one of add, delete, or modify a CNAME record in the DNS records 520.

Figure 6:
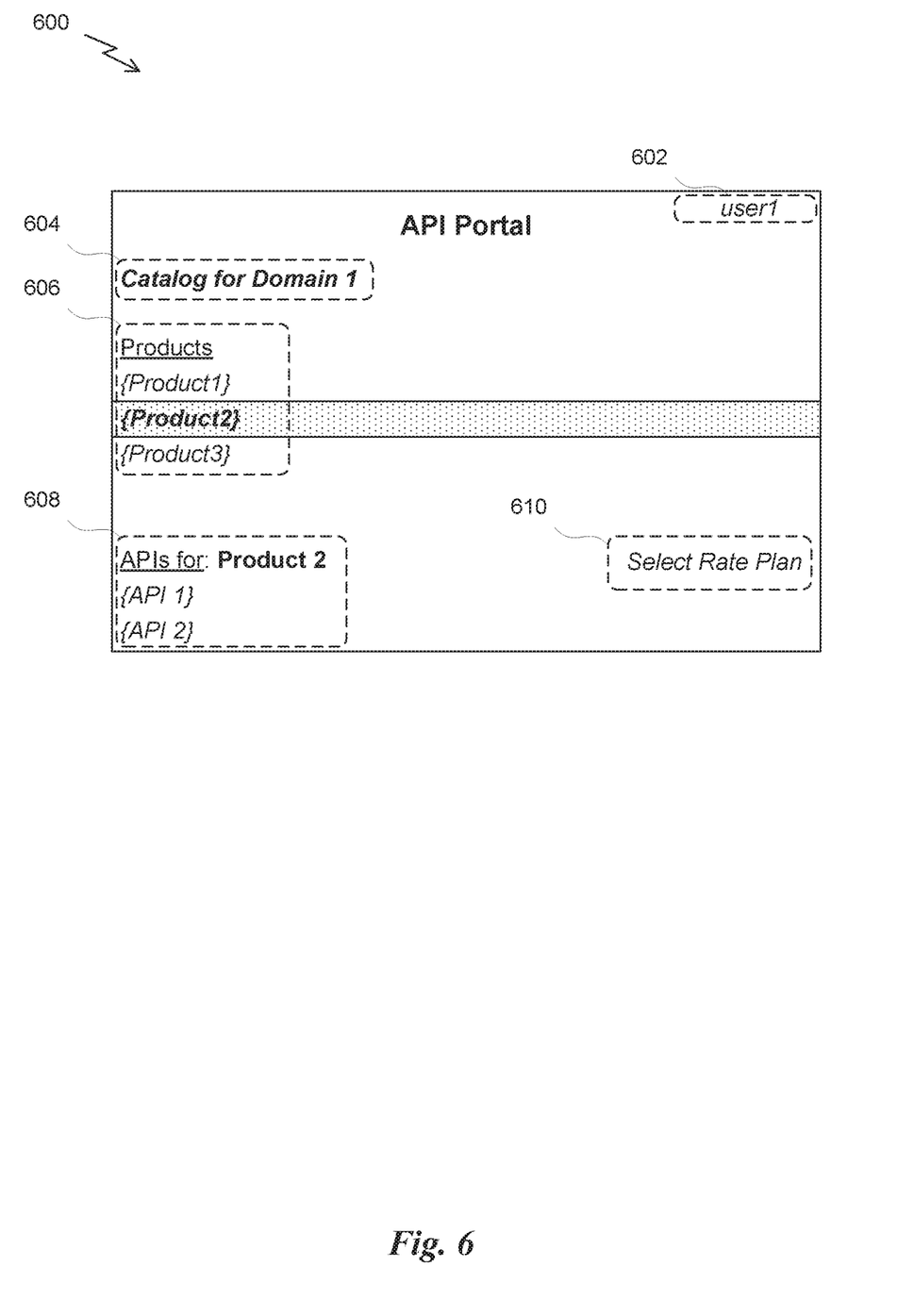
FIG. 6 illustrates a user interface associated with the API portal, in accordance with some embodiments.

FIG. 6 illustrates a user interface 600 associated with the API portal 180, in accordance with some embodiments. In an embodiment, the user interface 600 is displayed in a web browser of a client device 190 and enables a developer viewing a display of the client device to receive information related to products 104 in a global catalog maintained by the organization.

As depicted in FIG. 6, the user interface 600 includes a number of user interface (UX) elements including UX element 602 that enables a developer to sign-in to the API portal 180 application based on credentials for a user account created for the developer. In an embodiment, the user interface 600 also includes UX element 604 that enables a developer to select a catalog of products for a particular domain. For example, selecting the UX element 604 can allow the user to select one of a plurality of domains associated with the application that are available to the developer. In some embodiments, the user account for the developer is associated with various permissions that enable the API portal 180 to restrict the number of domains available to be viewed by the developer associated with the user account. Thus, the API portal 180 can only allow the developer to access or view products that have been approved for that user account based on the permissions.

In an embodiment, the user interface 600 also includes UX elements) 606 that enable a developer to select a particular product within the catalog for the selected domain. As shown in FIG. 6, a second product, Product2, is shown as selected in the user interface 600. In an embodiment, in response to selecting one of the products in the UX element(s) 606, the API portal 180 updates the user interface 600 to include UX element(s) 608 to display information related to one or more APIs 102 included in the selected product 104. In some embodiments, a developer can select one of the listed APIs 102 to display additional information about the selected API 102. For example, the user interface 600 can display a new screen with official documentation for the selected API 102.

In some embodiments, the user interface 600 can also include additional UX elements with additional functionality. For example, as depicted in FIG. 6, the UX element 610 enables a developer to subscribe to an available rate plan 106 for the selected product if the user account is not already subscribed to that product. The rate plan can enable a developer to pay for a given Quality of Service (QoS) associated with the APIs 102 of the product 104. In some embodiments, a consumer (e.g., a developer of the consumer application) of the product 104 subscribes to at least one plan that defines a rate limit for the product 104, as defined in a particular rate plan 106.

It will be appreciated that the API portal 180 provides third-party developers with a resource for documentation on the products developed and deployed by the organization as well as enable developers to subscribe to particular products so that the developer can use the product in a third-party application or service. While certain functionality is shown in FIG. 6, the API portal 180 is not limited to this specific design and additional UX elements or design are contemplated as being within the scope of the API portal 180.

Figure 7A:
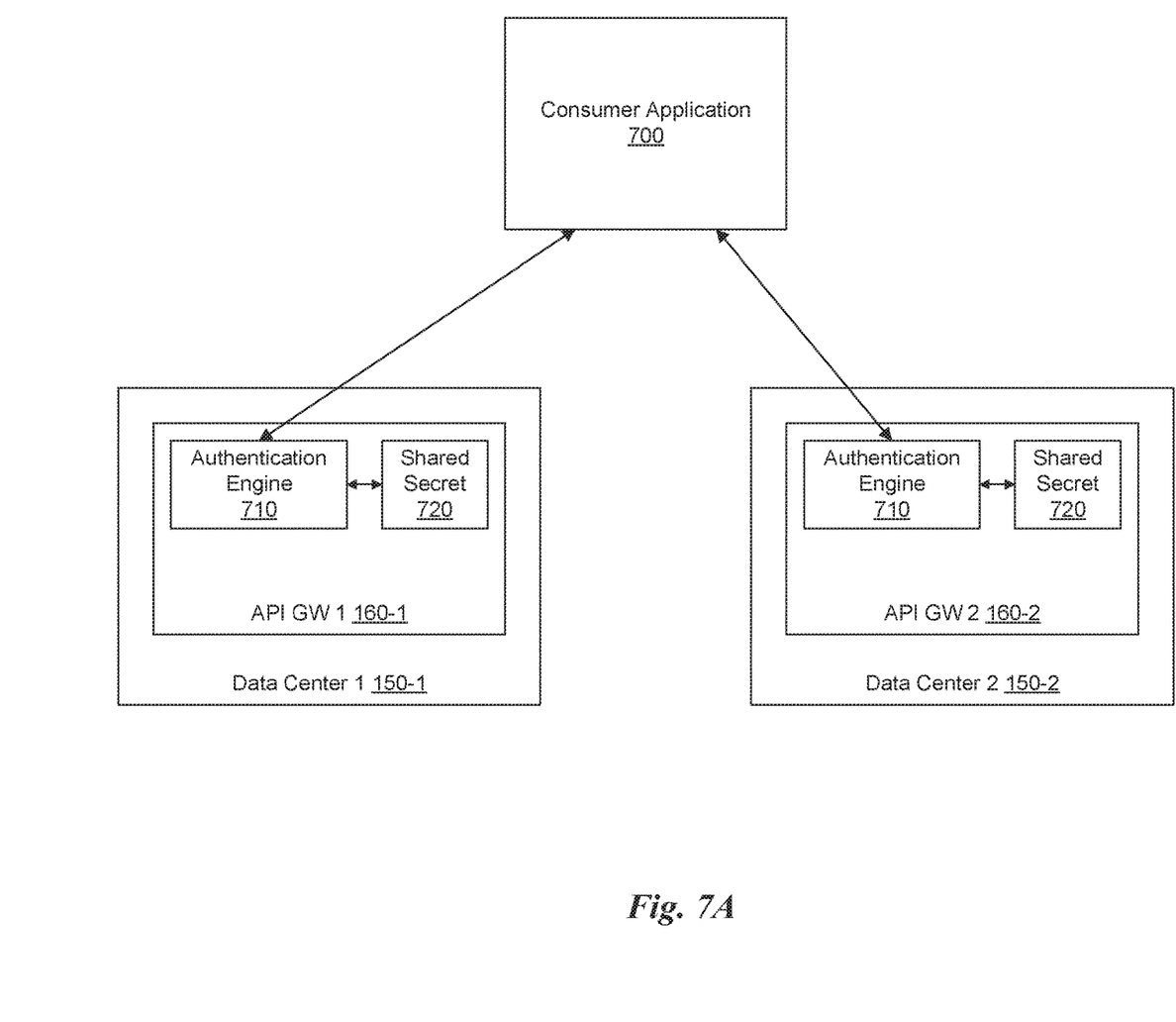
FIG. 7A illustrates a technique for authenticating a consumer application, in accordance with some embodiments.

FIG. 7A illustrates a technique for authenticating a consumer application 700, in accordance with some embodiments. A consumer application 700 can be internal, developed by the organization that manages the API management platform 110, or external, developed by a third-party and configured to utilize one or more products exposed through the API management platform 110. Security can be important to protect the data accessed through the APIs 102 and, therefore, in some embodiments, the consume application 700 should be authenticated each time an API call is made to one of the API gateways 160.

In an embodiment, each API gateway 160 includes an authentication engine 710. The authentication is called each time the consume application 700 makes an API call. In one embodiment, the API gateways 160 are configured to issue a session token to a consumer application 700 in response to the consumer application 700 sending a request to authenticate to the API gateway 160. In some embodiments, the request to authenticate includes credentials issued to the consumer application 700. The API gateway 160 can verify the credentials and issue the session token to the consumer application 700. In an embodiment, the session token is based on a shared secret 720 that is known to each instance of the API gateways 160 instantiated within the network. For example, as depicted in FIG. 7A, both a first API gateway 160-1 located in a first data center 150-1 and a second API gateway 160-2 located in a second data center 150-2 are provided with the same shared secret 720. Thus, a session token issued by the first API gateway 160-1 to the consume application 700 can be transmitted to the second API gateway 160-2, which can verify the authenticity of the session token based on the shared secret 720 without having to re-authenticate the consumer application 700 using the credentials. In this manner, a consumer application 700 that makes an API call to a first API 102 deployed to the first API gateway 160-1 can make a second API call to a second API 102 deployed to the second API gateway 160-2 without additional latency associated with having to be separately authenticated by the second API gateway 160-2.

In an embodiment, the authentication engine 710 is implemented based on the Open ID Connect (OIDC) protocol, which is built on the OAuth protocol. It will be appreciated that the OIDC and OAuth protocols enable end users, through client devices, to connect to the consumer application 700 with credentials for user accounts related to the consumer application 700. The consumer application 700 is an OpenID identity provider, which allows the user accounts for the consumer application 700 to be authorized by the authentication engine 710 without having to share the credentials of the end users. The session token, passed via the OAuth protocol, then enables the consumer application 700 to access other API gateways 160 without needing to separately perform re-authentication.

In another embodiment, the authentication engine 710 is implemented based on the OAuth protocol, which enables the consumer application to be authenticated by the authentication engine 710 in one API gateway 160-1, which issues a session token to the consumer application 700 that enables the consumer application 700 the ability to access a second API gateway 160-2. In such embodiments, end users are not required to provide credentials to the consumer application 700 as any end user of the consumer application 700 is authorized to access the API gateways 160 based on credentials issued to the consumer application 700.

It will be appreciated that, in some embodiments, at least one API gateway 160 is designated as internal, where access to the APIs 102 on the API gateway 160 are restricted to internal clients or devices, and at least one additional API gateway 160 is designated as external, where access to the APIs 102 is permitted for at least some external clients or devices. In such embodiments, the authentication engine 710 can enforce these policies based, at least in part, on the credentials provided by the consumer application 700 and/or end user client devices connected to the consumer application 700.

Figure 7B:
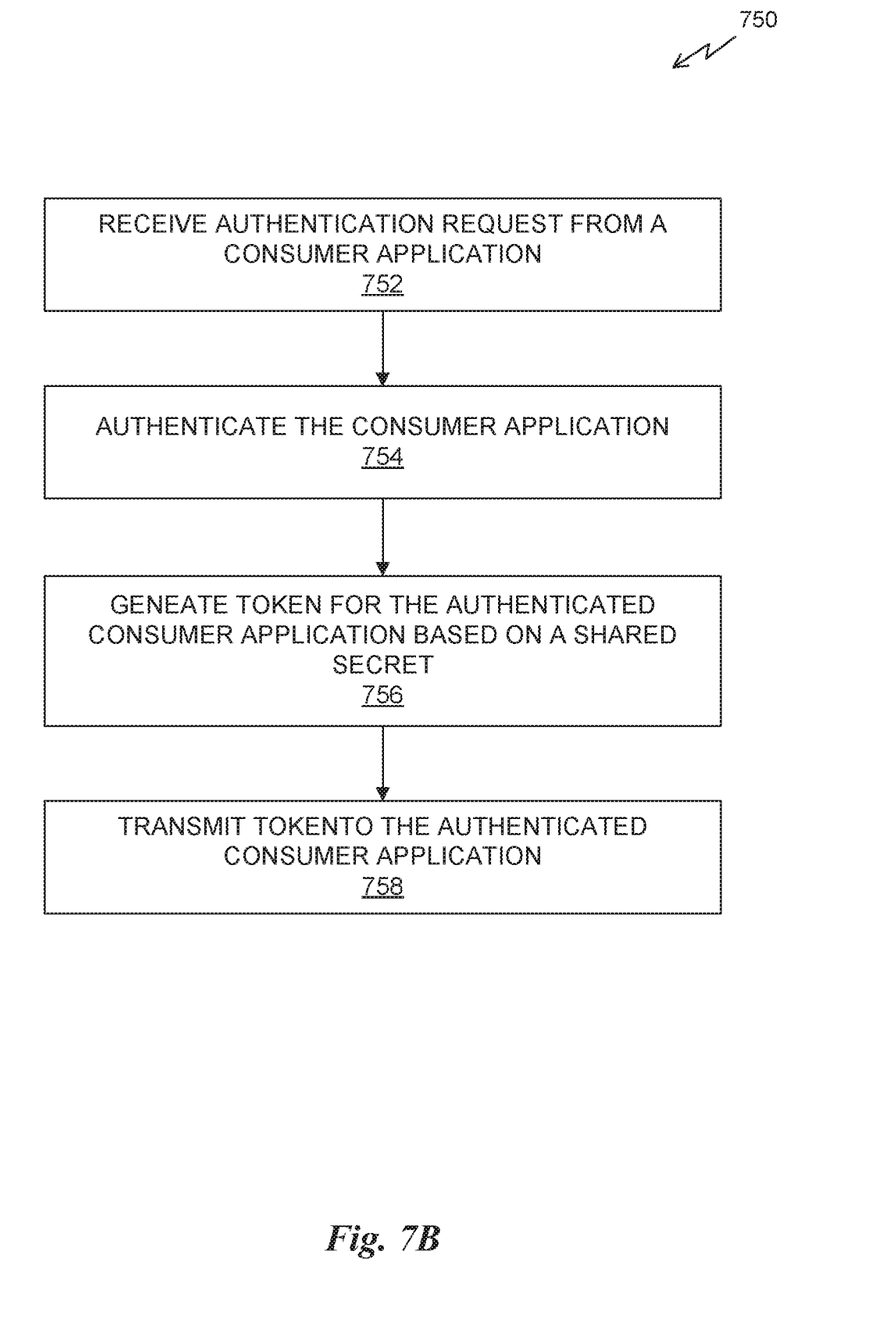
FIG. 7B is a flow diagram of a method for authenticating a consumer application, in accordance with some embodiments.

FIG. 7B is a flow diagram of a method 750 for authenticating a consumer application, in accordance with some embodiments. The method 750 can be performed by a program, custom circuitry, or by a combination of custom circuitry and a program. For example, the method 750 can be performed by one or more processors configured to execute instructions that cause the processor(s) to carry out the function of the authentication engine 710. Furthermore, persons of ordinary skill in the art will understand that any system that performs method 750 is within the scope and spirit of the embodiments described herein.

At step 752, an authentication request is received from a consumer application. In an embodiment, the authentication request can be in a format as specified by an OpenID Connect protocol.

At step 754, the consumer application is authenticated. In an embodiment, the authentication request is authenticated based on the OpenID Connect protocol using one or more attributes shared in the authentication request.

At step 756, a token is generated for the authenticated consumer application based on a shared secret. In an embodiment, each of the API gateways 160 includes a shared secret 720 that is known to all API gateways 160. The token is generated based on the shared secret 720 such that other API gateways 160 that receive the token can verify the authenticity of the token using their copy of the shared secret 720.

At step 758, the token is transmitted to the authenticated consumer application. In an embodiment, the token is transmitted in accordance with the OAuth protocol. The token can include an expiration date/time that indicates when the consumer application is no longer authenticated and may need to be re-authenticated using a new authentication request.

Figure 8:
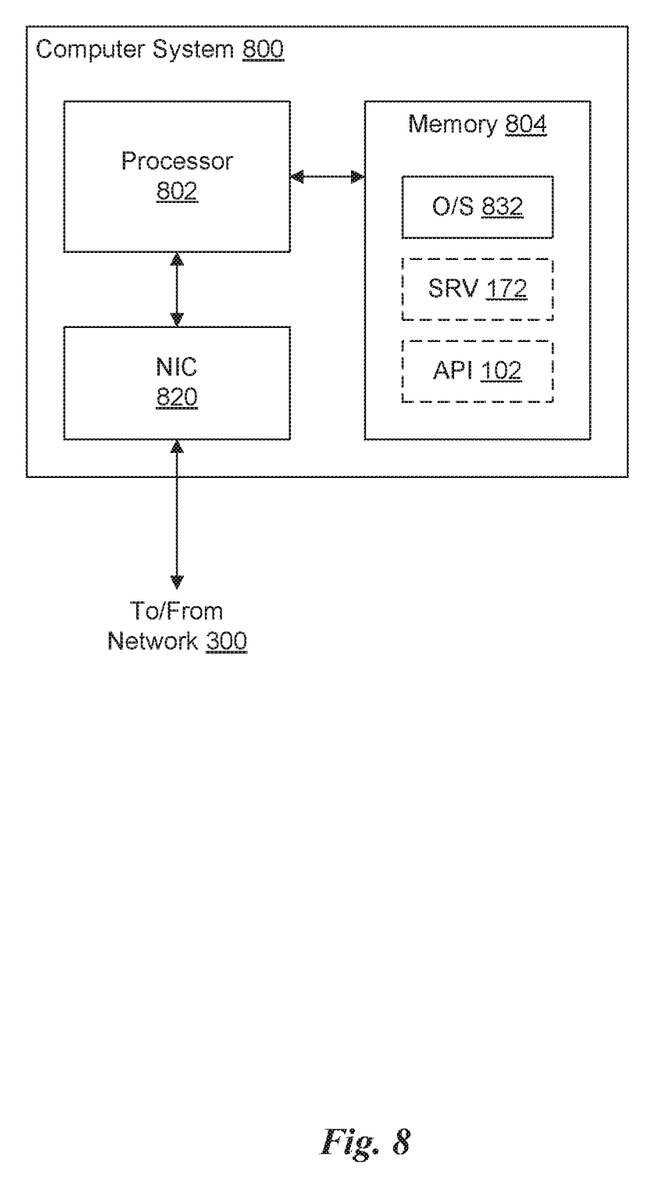
FIG. 8 illustrates an exemplary computer system, in accordance with some embodiments.

FIG. 8 illustrates an exemplary computer system 800, in accordance with some embodiments. The computer system 800 includes a processor 802, a non-volatile memory 804, and a network interface controller (NIC) 820. The processor 802 can execute instructions that cause the computer system 800 to implement the functionality various elements of the system 100 described above.

Each of the components 802, 804, and 820 can be interconnected, for example, using a system bus to enable communications between the components. The processor 802 is capable of processing instructions for execution within the system 800. The processor 802 can be a single-threaded processor, a multi-threaded processor, a vector processor or parallel processor that implements a single-instruction, multiple data (SIMD) architecture, or the like. The processor 802 is capable of processing instructions stored in the volatile memory 804. In some embodiments, the volatile memory 804 is a dynamic random access memory (DRAM). The instructions can be loaded into the volatile memory 804 from a non-volatile storage, such as a Hard Disk Drive (HDD) or a solid state drive (not explicitly shown), or received via the network. In an embodiment, the volatile memory 804 can include instructions for an operating system 832 as well as one or more applications, such as services 172 or APIs 102. It will be appreciated that the application(s) can be configured to provide the functionality of one or more components of the system 100, as described above. The MC 820 enables the computer system 800 to communicate with other devices over a network, including a local area network (LAN) or a wide area network (WAN) such as the Internet.

It will be appreciated that the computer system 800 is merely one exemplary computer architecture and that the processing devices implemented in the system 100 can include various modifications such as additional components in lieu of or in addition to the components shown in FIG. 8. For example, in some embodiments, the computer system 800 can be implemented as a system-on-chip (SoC) that includes a primary integrated circuit die containing one or more CPU cores, one or more GPU cores, a memory management unit, analog domain logic and the like coupled to a volatile memory such as one or more SDRAM integrated circuit dies stacked on top of the primary integrated circuit dies and connected via wire bonds, micro ball arrays, and the like in a single package (e.g., chip). In another embodiment, the computer system 800 can be implemented as a server device, which can, in some embodiments, execute a hypervisor and one or more virtual machines that share the hardware resources of the server device.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the embodiments as claimed.

What is claimed is:

1. A system for managing services within a hybrid cloud architecture, the system comprising:
    at least one processor configured to deploy application programming interfaces (APIs) to a plurality of API gateways accessible via a network,
    wherein the network is divided into one or more spaces, each space in the one or more spaces corresponding to a set of API gateways deployed to one or more geographical regions, and
    wherein each API gateway is connected to a number of services executing on a cluster of runtime devices connected to the API gateway.

2. The system of claim 1, wherein the at least one processor is configured to deploy APIs to at least two API gateways associated with at least two different spaces.

3. The system of claim 1, wherein an organization that develops the APIs is different from an external organization that develops at least one service in the number of services, and wherein the external organization maintains a data center that includes at least one API gateway configured to receive an API from the at least one processor via the network.

4. The system of claim 1, wherein the at least one processor is configured to interact with one or more Domain Name System (DNS) name servers to map a fully qualified domain name to an Internet Protocol (IP) address for a corresponding API gateway.

5. The system of claim 4, wherein the at least one processor is configured to interact with at least two DNS name servers for at least two different domains corresponding to at least two branded organizations.

6. The system of claim 4, wherein the fully qualified domain name includes a DNS prefix that indicates a particular space associated with the corresponding API gateway.

7. The system of claim 4, wherein interacting with one or more DNS name servers comprises at least one of adding, deleting, or modifying a CNAME record.

8. The system of claim 4, wherein the at least one processor is further configured to update a security certificate to add the fully qualified domain name to a subject alternative name (SAN) field of the security certificate.

9. The system of claim 1, the system further comprising:
    an API portal configured to authenticate users and provide authenticated users visibility to one or more catalogs of products,
    wherein each catalog is associated with a domain and includes one or more products associated with the domain.

10. The system of claim 9, wherein each product corresponds to one or more APIs, and wherein a consumer of the product subscribes to at least one plan that defines a rate limit for the product.

11. The system of claim 1, wherein at least one API gateway is designated as internal and at least one additional API gateway is designated as external.

12. The system of claim 1, wherein each API is permitted to call services within a data center in which the API is deployed, and each API is prohibited from calling services in other data centers directly.

13. The system of claim 1, wherein each API gateway includes an authentication engine configured to generate a token for an authenticated consumer application, wherein the token is generated based on a shared secret provided to the plurality of API gateways, and wherein the authenticated consumer application is configured to utilize the token when connecting to other API gateways in the plurality of API gateways.

14. A method for managing services within a hybrid cloud architecture, the method comprising: receiving one or more application programming interfaces (APIs) that correspond to one or more services available over a network; and deploying the one or more APIs to a plurality of API gateways accessible via the network, wherein each API gateway is associated with a space that corresponds with one or more geographical regions.

15. The method of claim 14, wherein deploying the one or more APIs to the plurality of API gateways comprises: for each API in the one or more APIs: identifying a particular space corresponding to the API, and transmitting the API to one or more API gateways associated with the particular space.

16. The method of claim 14, further comprising: interacting with one or more Domain Name System (DNS) name servers to map a fully qualified domain name to an Internet Protocol (P) address for a corresponding API gateway; and updating a security certificate to add the fully qualified domain name to a subject alternative name (SAN) field of the security certificate.

17. The method of claim 14, wherein each API gateway includes an authentication engine configured to:

generate a token for an authenticated consumer application, wherein the token is generated based on a shared secret provided to the plurality of API gateways, and wherein the authenticated consumer application is configured to utilize the token when connecting to other API gateways in the plurality of API gateways.

18. A non-transitory computer-readable medium storing instructions that, when executed by a processor, cause the processor to manage services within a hybrid cloud architecture by performing steps comprising: receiving one or more application programming interfaces (APIs) that correspond to one or more services available over a network; and deploying the one or more APIs to a plurality of API gateways accessible via the network, wherein each API gateway is associated with a space that corresponds with one or more geographical regions.

19. The non-transitory computer-readable medium of claim 18, wherein deploying the one or more APIs to the plurality of API gateways comprises: for each API in the one or more APIs: identifying a particular space corresponding to the API, transmitting the API to one or more API gateways associated with the particular space.

20. The non-transitory computer-readable medium of claim 18, the steps further comprising: interacting with one or more Domain Name System (DNS) name servers to map a fully qualified domain name to an Internet Protocol (IP) address for a corresponding API gateway; and updating a security certificate to add the fully qualified domain name to a subject alternative name (SAN) field of the security certificate.

21. The non-transitory computer-readable medium of claim 18, wherein each API gateway includes an authentication engine configured to:

generate a token for an authenticated consumer application, wherein the token is generated based on a shared secret provided to the plurality of API gateways, and wherein the authenticated consumer application is configured to utilize the token when connecting to other API gateways in the plurality of API gateways.

* * * * *